(No Model.)

W. B. DRAPER.
CLASP OR FASTENING DEVICE.

No. 576,097.  Patented Feb. 2, 1897.

WITNESSES:

INVENTOR:
W. B. Draper

UNITED STATES PATENT OFFICE.

WILLIAM B. DRAPER, OF MALDEN, MASSACHUSETTS, ASSIGNOR TO WARREN B. PAGE, OF NEWTON, MASSACHUSETTS.

CLASP OR FASTENING DEVICE.

SPECIFICATION forming part of Letters Patent No. 576,097, dated February 2, 1897.

Application filed May 9, 1896. Serial No. 590,861. (No model.)

*To all whom it may concern:*

Be it known that I, WILLIAM B. DRAPER, of Malden, in the county of Middlesex and State of Massachusetts, have invented certain new and useful Improvements in Clasps or Fastening Devices, of which the following is a specification.

This invention relates to clasps or fastening devices such as are used for gloves and for other like purposes, the fastener comprising two general parts, one of which is socketed or recessed to receive the other.

The invention relates to the socketed member of a clasp or fastening of this character;
and it consists in the improved construction, which I will now proceed to describe and claim.

Figure 1:
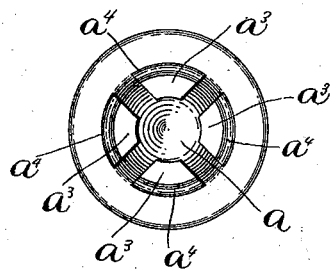
Figure 2:
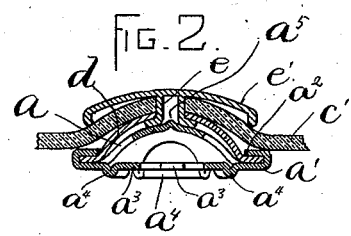
Figure 3:
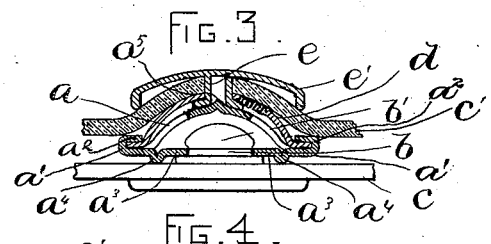
Figure 4:
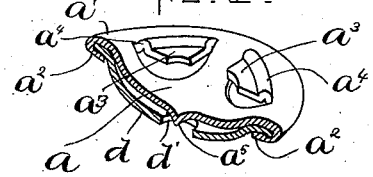
Figure 5:
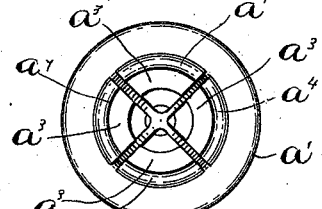
Figure 6:
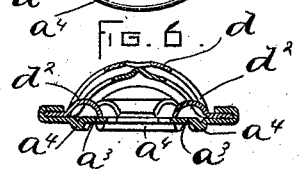

Of the accompanying drawings, forming a part of this specification, Figure 1 represents a top view of my improved fastening member. Fig. 2 represents a sectional view of the same. Fig. 3 represents a view similar to Fig. 2, showing the stud or complemental member engaged with the socketed member. Fig. 4 represents a perspective sectional view of the socketed member. Fig. 5 represents a view similar to Fig. 1, showing the grasping-jaws enlarged. Fig. 6 represents a sectional view showing the grasping-tongues supported or reinforced by supplemental tongues.

The same letters of reference indicate the same parts in all the figures.

In carrying out my invention I take a disk of sheet metal and by means of suitable dies form a concavo-convex depression or socket $a$ therein and a raised annular margin $a'$ surrounding said socket, said margin having an inwardly-turned lip or flange $a^2$.

$a^3$ $a^3$ represent tongues of metal integral with the said disk and cut out from the recessed portion $a$ and bent upwardly therefrom, so that their upper sides are substantially flush with the raised margin $a'$, the tongues projecting inwardly from said margin over the recess or depression formed by the part $a$. The inner ends of the tongues $a^3$ are suitably formed to grasp or engage a fastening member $b$, formed to enter the socketed portion $a$, the said member $b$ having an enlarged head $b'$ and suitable means of attachment to the part $c$ of a glove or other article with which the clasp is used.

I prefer to form corrugations $a^4$ on the tongues $a^3$, as shown in the drawings, said corrugations increasing the resilience of the tongues, besides forming an ornamental finish and assisting to guide the member $b$ into the space between the inner ends of the tongues.

$d$ represents a concavo-convex washer, the margin of which is secured by the flange $a^2$, said washer being formed so that a space exists between it and the portion $a$. At the central portion of the washer $d$ is an orifice $d'$, which coincides with a boss or projection $a^5$ on the central portion of the part $a$, the arrangement being such that the tubular shank $e$ of a device used to secure the socketed member to the part $c'$ of the glove or other article inserted in the orifice $d'$ will be spread or upset by the projection $a^5$ and the adjoining portions of the under side of the socket $a$, and will be thus engaged with the washer $d$ and the part $a$, as shown clearly in Fig. 2. An enlarged head $e'$ is formed on the tubular shank $e$ to bear against one side of the part $c'$.

In Fig. 6 I show the washer $d$ provided with supplemental tongues $d^2$, which are struck up from the body of the washer and are arranged to project through the openings in the recessed portion $a$ and bear on the grasping tongues or jaws $a^3$ to support or reinforce the latter, thus increasing the strength of the engagement between the two members.

In Fig. 5 the jaws or tongues $a^3$ are shown larger than in the other figures.

I claim—

1. A fastening or clasp member comprising a circular plate having a central cup or depression, a raised margin surrounding said depression, and tongues cut from the material of the depressed portion and projecting over the same to grasp the shank of a headed fastening member.

2. A fastening or clasp member comprising a circular plate having a central cup or depression, a raised margin surrounding said depression, and tongues cut from the material of the depressed portion and projecting over the same, said tongues being ribbed or corrugated to increase their resilience.

3. A fastening or clasp member comprising a circular plate having a central cup or depression, a raised margin surrounding said depression, and tongues cut from the material of the depressed portion and projecting over the same to grasp the shank of a headed fastening member, said plate having a central boss or projection, and a cup-shaped washer attached at its margin to said plate and having a central orifice coinciding with said projection.

4. A fastening or clasp member comprising a circular plate having a central cup or depression, a raised margin surrounding said depression, and tongues cut from the material of the depressed portion and projecting over the same to grasp the shank of a headed member, and a cup-shaped washer attached at its margin to said plate and having supplemental tongues arranged to support or reinforce the said grasping-tongues.

In testimony whereof I have signed my name to this specification, in the presence of two subscribing witnesses, this 15th day of April, A. D. 1896.

WILLIAM B. DRAPER.

Witnesses:
A. D. HARRISON,
H. L. ROBBINS.